US012773979B2

(12) United States Patent
Mori et al.

(10) Patent No.: US 12,773,979 B2
(45) Date of Patent: Oct. 27, 2026

(54) RUNNING DRIVE CONTROL DEVICE FOR VEHICLE

(71) Applicant: MITSUBISHI JIDOSHA KOGYO KABUSHIKI KAISHA, Tokyo (JP)

(72) Inventors: Jumpei Mori, Tokyo (JP); Kazuhiro Ohi, Tokyo (JP); Yuki Ohno, Tokyo (JP); Takahiro Chujo, Tokyo (JP); Shinya Kawai, Tokyo (JP); Shu Fujihashi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 19/108,701

(22) PCT Filed: Sep. 21, 2022

(86) PCT No.: PCT/JP2022/035178
§ 371 (c)(1),
(2) Date: Mar. 4, 2025

(87) PCT Pub. No.: WO2024/062554
PCT Pub. Date: Mar. 28, 2024

(65) Prior Publication Data
US 2026/0077759 A1 Mar. 19, 2026

(51) Int. Cl.
*B60W 20/20* (2016.01)
*B60W 20/40* (2016.01)
*B60W 30/02* (2012.01)

(52) U.S. Cl.
CPC ............ *B60W 20/20* (2013.01); *B60W 20/40* (2013.01); *B60W 30/02* (2013.01); *B60W 2510/107* (2013.01); *B60W 2520/28* (2013.01)

(58) Field of Classification Search
CPC ...... B60W 20/20; B60W 20/40; B60W 30/02; B60W 2510/107; B60W 2520/28;
(Continued)

(56) References Cited

U.S. PATENT DOCUMENTS 6,549,840 B1 4/2003 Mikami et al.
8,871,866 B2 * 10/2014 Guo ........................ C08L 23/06 525/88
(Continued)

FOREIGN PATENT DOCUMENTS

JP 9-329222 A 12/1997
JP 2001-105919 A 4/2001
(Continued)

OTHER PUBLICATIONS

Japanese Office Action for Japanese Application No. 2024-547993, dated Nov. 11, 2025, with English translation.
(Continued)

*Primary Examiner* — Bhavesh V Amin
(74) *Attorney, Agent, or Firm* — Birch, Stewart, Kolasch & Birch, LLP

(57) ABSTRACT

In a vehicle 1 in which front wheels 4 are driven by transferring power to the front wheels 4 from an engine 3 and a front motor 2 via a transaxle 7, and rear wheels 6 are driven by a rear motor 5, thus causing the vehicle 1 to run, the vehicle 1 includes a hybrid control unit 18 that calculates a required output for running the vehicle, sets an output ratio between a front wheels 4 side and a rear wheels 6 side, and controls outputs of the engine 3, the front motor 2, and the rear motor 5 based on the required output of the vehicle 1 and the output ratio, a T/A oil temperature sensor 30 that acquires an oil temperature in the transaxle 7, and a T/A protection control unit 50 that performs transaxle protection control in a case in which the oil temperature T in the transaxle 7 becomes a first threshold T1 or more, the transaxle protection control reducing a proportion of the output on a front wheels 4 side compared with the proportion of the output on the front wheels 4 side of a case in which
(Continued)

the oil temperature T in the transaxle 7 is less than the first threshold T1.

9 Claims, 4 Drawing Sheets

(58) Field of Classification Search
CPC ......... B60W 2510/18; B60W 2520/10; B60W 2520/26; B60W 2710/083; B60W 10/06; B60W 10/08; B60W 20/15; B60W 30/18127; B60W 30/1843; B60K 6/387; B60K 6/442; B60K 6/448; B60K 6/52; B60K 17/354; Y02T 10/62; F16H 57/0412; F16H 59/72
See application file for complete search history.

(56) References Cited

U.S. PATENT DOCUMENTS

| | | | | |
|---|---|---|---|---|
| 2010/0012373 | A1* | 1/2010 | Guo ........................ | H01B 3/441 174/110 SY |
| 2010/0122845 | A1* | 5/2010 | Guo ........................ | C08L 23/06 524/502 |
| 2011/0079427 | A1* | 4/2011 | Powale .................. | H01B 3/427 174/72 A |
| 2016/0101771 | A1 | 4/2016 | Hata et al. | |
| 2017/0282897 | A1 | 10/2017 | Shimizu et al. | |
| 2019/0168744 | A1 | 6/2019 | Ienaga et al. | |
| 2024/0401693 | A1* | 12/2024 | Li .......................... | H02K 11/25 |
| 2025/0230291 | A1* | 7/2025 | Anzelmo ............... | C08K 3/042 |

FOREIGN PATENT DOCUMENTS

| | | | |
|---|---|---|---|
| JP | 2007-245873 | A | 9/2007 |
| JP | 2011-127718 | A | 6/2011 |
| JP | 2011-174546 | A | 9/2011 |
| JP | 2017-178056 | A | 10/2017 |
| JP | 2019-103235 | A | 6/2019 |
| JP | 2020-162219 | A | 10/2020 |

OTHER PUBLICATIONS

International Search Report for PCT/JP2022/035178 (PCT/ISA/210) mailed on Dec. 13, 2022.
International Preliminary Report on Patentability for International Application No. PCT/JP2022/035178, dated Mar. 27, 2025, with English translation.
Extended European Search Report for European Application No. 22959518.6, dated Oct. 10, 2025.
European Communication pursuant to Article 94(3) EPC for European Application No. 22 959 518.6, dated Jul. 30, 2026.

* cited by examiner

FIG. 3

| DRIVE MODE | ALL DRIVE MODES | | | | | |
|---|---|---|---|---|---|---|
| RUNNING MODE | EV/SERIES | | | | PARALLEL | |
| POWER RUNNING/ REGENERATIVE RUNNING | POWER RUNNING | | REGENERATIVE RUNNING | | — | |
| ASC SWITCH | ON | OFF | ON | OFF | — | |
| STEP1 | 3:7 | NORMAL DISTRIBUTION | NORMAL DISTRIBUTION | | NORMAL DISTRIBUTION | NO OUTPUT SUPPRESSION |
| STEP2 | 3:7 | 3:7 | NORMAL DISTRIBUTION | | NORMAL DISTRIBUTION | PERFORM OUTPUT SUPPRESSION ACCORDING TO VEHICLE SPEED |
| STEP3 | 3:7 | 3:7 | NORMAL DISTRIBUTION | | NORMAL DISTRIBUTION | PERFORM STRONGER OUTPUT SUPPRESSION THAN STEP 2 (NOT DEPENDING ON VEHICLE SPEED) |

RUNNING DRIVE CONTROL DEVICE FOR VEHICLE

TECHNICAL FIELD

The present invention relates to a technique of performing running drive control for a 4-wheel drive vehicle.

BACKGROUND ART

There are vehicles, such as 4-wheel drive hybrid vehicles, in which front wheels and rear wheels of the vehicle are driven by an engine and a motor.

Patent Document 1 discloses a 4-wheel drive vehicle in which front wheels are mainly driven by an engine, and rear wheels are driven by a motor when necessary. Further, the vehicle described in Patent Document 1 includes a control system in which, when the temperature of the motor for driving the rear wheels is a predetermined temperature or more, the control system reduces the output of the motor compared with that of the case in which the temperature of the motor for driving the rear wheels is less than the predetermined temperature, and the control system increases the output of the engine by a corresponding amount, thus ensuring a running driving force for the entire vehicle.

A transaxle is provided on the front wheels side, that is, on a power transfer path between the engine and the front wheels, a transmission and a differential device being built in the transaxle. Lubricating oil (hydraulic oil) is enclosed in the transaxle.

PRIOR ART DOCUMENT

Patent Document

Patent Document 1: Japanese Patent Laid-Open No. 9-329222

SUMMARY OF THE INVENTION

Problems to be Solved by the Invention

Regarding 4-wheel drive hybrid vehicles, 4-wheel drive vehicles have been developed in which a motor for driving front wheels and a motor for driving rear wheels are provided, and the front wheels are driven by an engine and the motor, so that power can be generated by driving a generator by the engine, whereas the rear wheels are driven by the motor.

In such a vehicle in which the front wheels are driven by the engine and the motor, the temperature (lubricating oil temperature) of the transaxle included in a front wheel drive system is also likely to rise. Particularly, in a hybrid vehicle that enables a series mode, power is transferred in the transaxle simultaneously via two paths, that is, a path between the engine and the generator, and a path between the motor and the front wheels and hence, the temperature of lubricating oil in the transaxle is likely to rise.

However, an excessive rise in temperature of the lubricating oil in the transaxle may cause problems, such as a drop in lubricating performance or an increase in the load on the transaxle.

The present invention has been made to solve such problems, and an object thereof is to provide a drive control device for a 4-wheel drive vehicle, the drive control device being capable of ensuring the running driving force of the entire vehicle, and preventing an excessive rise in temperature of the transaxle.

Means for Solving the Problems

To achieve the above described object, a running drive control device for a vehicle of the present invention is characterized in that, in the vehicle in which first running wheels, being either of front wheels or rear wheels, are driven by transferring power to the first running wheels from a first running drive mechanism via a transaxle, and second running wheels, being the other of the front wheels or the rear wheels, are driven by a second running drive mechanism, thus causing the vehicle to run, the running drive control device includes: an output control unit that calculates a required output for running the vehicle, sets an output ratio between the first running drive mechanism and the second running drive mechanism, and calculates an output of the first running drive mechanism and an output of the second running drive mechanism based on the required output of the vehicle and the output ratio; a temperature detection unit that acquires an oil temperature in the transaxle; and a protection control unit that performs transaxle protection control in a case in which the oil temperature in the transaxle becomes a first threshold or more, the first threshold being a predetermined value, the transaxle protection control reducing a proportion of the output of the first running drive mechanism compared with the proportion of the output of the first running drive mechanism of a case in which the oil temperature in the transaxle is less than the first threshold.

Consequently, when the temperature of the transaxle becomes the first threshold or more, the amount of a driving force that transfers through the transaxle is reduced by reducing the output of the first running drive mechanism while the required output is ensured and hence, it is possible to suppress a rise in temperature of the transaxle.

Preferably, the first running drive mechanism includes an engine and an electric motor, the engine, the electric motor, and a generator are connected to the transaxle, a running mode switching unit is provided, the running mode switching unit being configured to switch between at least either one of a series mode or an EV mode and a parallel mode, power being generated by driving the generator by transferring power to the generator from the engine via the transaxle, and the first running wheels being driven by transferring power to the first running wheels from the electric motor via the transaxle in the series mode, the first running wheels being driven by the electric motor via the transaxle in the EV mode, the first running wheels being driven by the engine and the electric motor in the parallel mode, and the protection control unit performs the transaxle protection control in a case in which switching to the series mode or the EV mode is performed by the running mode switching unit, whereas the protection control unit does not perform the transaxle protection control in a case in which switching to the parallel mode is performed.

Consequently, in the series mode or the EV mode, the transaxle protection control is performed, so that a rise in temperature of the transaxle is suppressed, whereas in the parallel mode, in which the amount of power transfer in the transaxle is smaller than that in the series mode and the EV mode, the transaxle protection control is not performed and hence, unnecessary changes of the output ratio between the front side and the rear side during running are suppressed, leading to enhancement of running performance of the vehicle.

Preferably, the running drive control device includes a regenerative power generation control unit that causes regenerative power generation to be performed during deceleration running of the vehicle, the regenerative power generation generating power by forcibly driving the first running drive mechanism by a rotational force of the first running wheels, wherein the protection control unit performs the transaxle protection control during power running of the first running drive mechanism, whereas the protection control unit does not perform the transaxle protection control during a period in which the regenerative power generation is being performed.

Consequently, during the power running of the first running drive mechanism, the transaxle protection control is performed, so that a rise in temperature of the transaxle is suppressed, whereas during the period in which regenerative power generation is performed, in which an output from the first running drive mechanism is not necessary and the amount of power transfer in the transaxle is relatively small, the transaxle protection control is not performed and hence, unnecessary changes of the output ratio between the front side and the rear side during running are suppressed, leading to enhancement of running performance of the vehicle.

Preferably, the vehicle includes a skid suppression control unit that suppresses a skid of the vehicle by controlling rotational speeds of the first running wheels and the second running wheels at a time of occurrence of the skid, and the protection control unit performs the transaxle protection control in a case in which skid suppression control by the skid suppression control unit is active, whereas the protection control unit does not perform the transaxle protection control in a case in which the skid suppression control by the skid suppression control unit is prohibited.

Consequently, by performing the transaxle protection control when the skid suppression control is active, it is possible to ensure running stability of the vehicle, and it is possible to suppress a rise in temperature of the transaxle.

Preferably, the running drive control device includes a vehicle speed acquisition unit that acquires a running speed of the vehicle, wherein in a case in which the oil temperature in the transaxle is a second threshold or more, the second threshold being larger than the first threshold, the protection control unit reduces the required output to a predetermined amount which is set based on the running speed.

Consequently, when the oil temperature in the transaxle becomes a temperature even higher than the first threshold that changes the output ratio between the front side and the rear side, the required output is reduced and hence, the amount of power that transfers through the transaxle is further reduced. Thus, a rise in temperature of the transaxle can be further suppressed. In addition, the required output is reduced based on the vehicle speed and hence, it is possible to appropriately set the reduction amount of the required output corresponding to a change in the effect of suppressing a rise in temperature of the transaxle caused by running wind of the vehicle.

Preferably, the vehicle includes a skid suppression control unit that suppresses a skid of the vehicle by controlling rotational speeds of the first running wheels and the second running wheels at a time of occurrence of the skid, and in a case in which the oil temperature in the transaxle is the second threshold or more, the protection control unit performs the transaxle protection control even in a case in which skid suppression control by the skid suppression control unit is prohibited.

Consequently, in the case in which the oil temperature in the transaxle is the second threshold or more, the second threshold being larger than the first threshold, even in the case in which the skid suppression control is prohibited, the transaxle protection control is performed and hence, it is possible to suppress a rise in temperature of the transaxle.

Preferably, in a case in which the oil temperature in the transaxle is a third threshold or more, the third threshold being larger than the second threshold, the protection control unit reduces the required output to a value remarkably lower than a maximum value of the predetermined amount.

Consequently, when the oil temperature in the transaxle becomes a temperature even higher than the second threshold, the required output is even further reduced and hence, the amount of power that transfers through the transaxle is further reduced, thus further suppressing a rise in temperature of the transaxle.

Preferably, the running drive control device includes: a rotational speed detection unit that detects rotational speeds of the front wheels and the rear wheels; and a slippage suppression control unit that performs, in a case in which slippage of the front wheels or the rear wheels is detected based on the rotational speeds, feedback control on the output ratio to suppress the slippage, wherein the protection control unit allows the feedback control to be performed even in a case in which the transaxle protection control is being performed.

Consequently, it is possible to avoid slippage even in the case in which the transaxle protection control is being performed.

Advantageous Effects of the Invention

According to the running drive control device of the present invention, when the oil temperature in the transaxle rises, the running driving force of the vehicle is ensured by ensuring the required output, and the amount of a driving force that transfers through the transaxle is reduced by reducing the output of the first running drive mechanism and hence, it is possible to protect the transaxle by suppressing a rise in temperature of the transaxle.

BRIEF DESCRIPTION OF THE DRAWINGS

FIG. 3 is a table collectively showing the control details of the transaxle protection control.

MODE FOR CARRYING OUT THE INVENTION

Hereinafter, an embodiment in which the present invention is applied to a hybrid vehicle (hereinafter referred to as vehicle 1) will be described.

Figure 1:
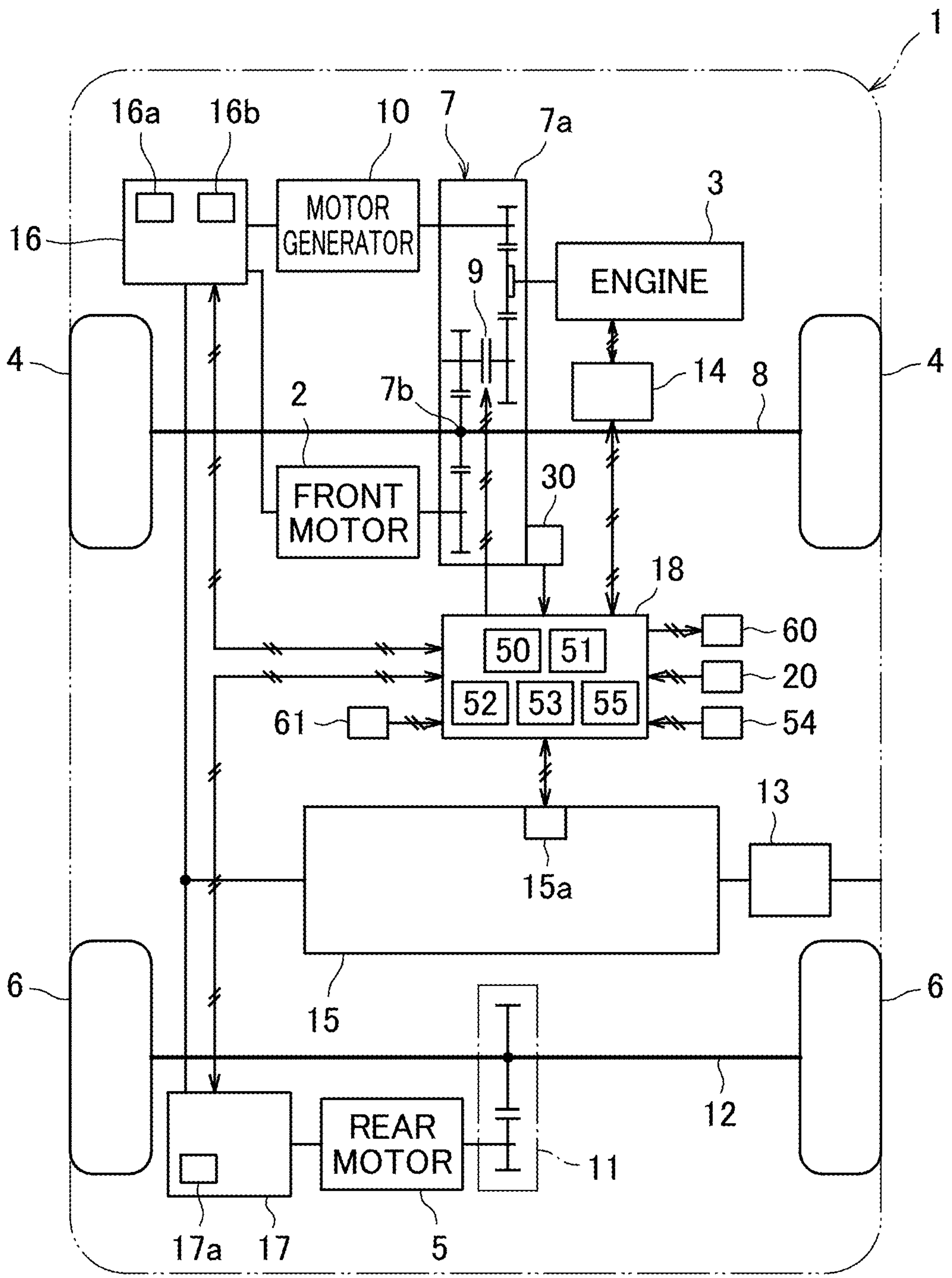
FIG. 1 is an overall configuration diagram of a running drive system of a vehicle in which a T/A oil temperature-based control device of the present embodiment is adopted.

FIG. 1 is an overall configuration diagram of a running drive system of the vehicle 1 in which a running drive control device of the present embodiment is adopted.

The vehicle 1 of the present embodiment is a hybrid vehicle equipped with, as a running drive source, a front motor 2 (first running drive mechanism, electric motor), a rear motor 5 (second running drive mechanism), and an engine 3 (first running drive mechanism).

The vehicle 1 is a 4-wheel drive vehicle which is configured to drive front wheels 4 (first running wheels) by the output of the front motor 2 or the output of the front motor 2 and the engine 3, and to drive rear wheels 6 (second running wheels) by the output of the rear motor 5.

The output shaft of the engine 3 is connected to a driveshaft 8, which is a driving shaft of the front wheels 4, via a transaxle 7. In the transaxle 7, a differential gear **7*b* and a clutch 9, which can connect/disconnect the power transfer path, are built in a case 7*a*, and lubrication oil is enclosed. When the clutch 9 is connected, the driving force of the engine 3 is transferred to the front wheels 4 via the transaxle 7 and the driveshaft 8, and when the clutch 9 is disconnected, the connection between the engine 3 and the front wheels 4** is disconnected.

The driving shaft of the front motor 2 is connected to the driveshaft 8 via the transaxle 7, and it is configured such that the driving force of the front motor 2 is transferred from the transaxle 7 to the front wheels 4 via the driveshaft 8. Further, a motor generator 10 is connected to the upstream side (engine 3 side) in the power transfer direction from the clutch 9 of the transaxle 7, and power is generated by the driving of the engine 3. Further, the motor generator 10 also functions as a starter motor that starts the engine 3 when the clutch 9 is disconnected. The rear motor 5 is connected to a driveshaft 12 of the rear wheels 6 via a reducer 11 such that the driving force of the rear motor 5 is transferred from the reducer 11 to the rear wheels 6 via the driveshaft 12.

An engine control unit 14 made up of an input/output device, a storage device (ROM, RAM, non-volatile RAM, etc.), a central processing unit (CPU), and the like is connected to the engine 3, and the engine control unit 14 controls throttle opening, fuel injection amount, ignition timing, and the like of the engine 3.

The front motor 2, the rear motor 5, and the motor generator 10 are, for example, three-phase AC motors, and a storage battery 15 for running drive is provided as a power supply for the front motor 2, the rear motor 5, and the motor generator 10. The storage battery 15 is made up of, for example, a secondary battery, such as a lithium ion battery, and includes a built-in battery monitoring unit **15*a*** that performs calculation of charging rate, detection of temperature, and so on.

The front motor 2 and the motor generator 10 are connected to the storage battery 15 via a front motor control unit 16. The front motor control unit 16 includes an inverter **16*a* for the front motor and an inverter 16*b* for the motor generator. The DC power of the storage battery 15 is converted into three-phase AC power by the inverter 16*a* for the front motor and the inverter 16*b* for the motor generator, and is supplied to the front motor 2 and the motor generator 10. Further, the regenerative power by the front motor 2 and the generated power by the motor generator 10 are converted into DC power by the inverter 16*a* for the front motor and the inverter 16*b* for the motor generator to be charged to the storage battery 15**.

The rear motor 5 is connected to the storage battery 15 via a rear motor control unit 17. The rear motor control unit 17 includes an inverter **17*a* for the rear motor. The DC power of the storage battery 15 is converted into three-phase AC power by the inverter 17*a* for the rear motor and supplied to the rear motor 5, and the regenerative power by the rear motor 5 is converted into DC power by the inverter 17*a* for the rear motor and charged to the storage battery 15**.

Further, the vehicle 1 includes a charging device 13 that charges the storage battery 15 by an external power supply.

The vehicle 1 includes a hybrid control unit 18 (output control unit) which is a control device for performing comprehensive control of the vehicle 1. The hybrid control unit 18 is made up of an input/output device, a storage device (ROM, RAM, non-volatile RAM, etc.), a central processing unit (CPU), and the like. The hybrid control unit 18 controls each operating state of the engine 3, the front motor 2, the motor generator 10, and the rear motor 5, and the connection and disconnection state of the clutch 9 of the transaxle 7, and the like. The battery monitoring unit **15*a*, the front motor control unit 16, the rear motor control unit 17, the engine control unit 14, a vehicle speed sensor 20 (vehicle speed acquisition unit) that detects the running speed (vehicle speed V) of the vehicle 1, and an accelerator opening sensor (not shown) that detects the accelerator opening are connected to the input side of the hybrid control unit 18, and detection and operation information from these devices is input to the hybrid control unit 18**.

Further, the front motor control unit 16, the rear motor control unit 17, the clutch 9 of the transaxle 7, and the engine control unit 14 are connected to the output side of the hybrid control unit 18.

Then, the hybrid control unit 18 includes a running mode switching unit 51 that switches the running mode of the vehicle 1 between an EV mode, a series mode, and a parallel mode based on various detected quantities such as of the accelerator opening sensor and the vehicle speed sensor 20. For example, in a region where the efficiency of the engine 3 is high, such as in a high-speed region, the running mode switching unit 51 sets the running mode to the parallel mode. In a medium-to-low speed region, the running mode switching unit 51 switches between the EV mode and the series mode based on the charging rate SOC of the storage battery 15, the required torque for vehicle running drive and the like.

In the EV mode, the clutch 9 of the transaxle 7 is disconnected, the engine 3 is stopped, and the front motor 2 and the rear motor 5 are driven by the power from the storage battery 15 to keep the vehicle 1 running.

In the series mode, after the clutch 9 of the transaxle 7 is disconnected, the engine 3 is operated to drive the motor generator 10, and the front motor 2 and the rear motor 5 are driven by the generated power by the motor generator 10 and the power from the storage battery 15 to keep the vehicle 1 running. Note that surplus power out of the generated power by the motor generator 10 is charged to the storage battery 15.

In the parallel mode, after the clutch 9 of the transaxle 7 is connected, the engine 3 is operated to transfer the driving force from the transaxle 7 to the front wheels 4, and when there is a surplus of engine driving force, the surplus is regenerated by the front motor 2, and when the engine driving force is in short, the engine is assisted with the front motor 2 by using the power of the storage battery 15.

Further, the hybrid control unit 18 calculates total required output required for the running of the vehicle 1 based on the various detected quantities and operation information, and distributes the total required output between the front motor 2 side and the rear motor 5 side in the EV mode and the series mode, and distributes the total required output between the front motor 2 side, the engine 3 side, and the rear motor 5 side in the parallel mode. The output ratio between the front wheel side (the front motor 2, the engine 3) and the rear wheel side (rear motor 5) is calculated by the hybrid control unit 18. Note that the output ratio between the front wheels 4 side and the rear wheels 6 side is usually approximately 40 to 50:60 to 50, for example.

Based on the required output which is distributed respectively, and the gear ratio of the transaxle 7 from the front motor 2 to the front wheels 4, the gear ratio of the transaxle 7 from the engine 3 to the front wheels 4, and the gear ratio of the reducer 11 from the rear motor 5 to the rear wheels 6, the hybrid control unit 18 sets the required torque of each of the front motor 2, the engine 3, and the rear motor 5, and outputs command signals to the front motor control unit 16, the rear motor control unit 17, and the engine control unit 14 so as to achieve each required torque.

In the front motor control unit 16 and the rear motor control unit 17, a target current value for the amount of current to be caused to flow through the coil of each phase of the front motor 2 and the rear motor 5 in order to achieve the required torque is calculated based on the command signal from the hybrid control unit 18. Then, based on the target current value, the inverter 16*a* for the front motor and the inverter 17*a* for the rear motor are subjected to switching control to control the current value of each coil to be the target current value, thereby achieving required torque for each. Note that the same applies to power generation of the motor generator 10, and the inverter 16*b* for the motor generator is subjected to switching control based on the target current value obtained from the required torque on the negative side, thereby achieving the target current value.

In the engine control unit 14, based on the command signal from the hybrid control unit 18, target values for throttle opening, fuel injection amount, and ignition timing for achieving the required torque are calculated to achieve the required torque by control based on those target values.

Further, the vehicle 1 has a regenerative power generation function of generating power by forcibly driving the front motor 2 and the rear motor 5 by the rotational force of the wheels 4, 6 during deceleration running. The hybrid control unit 18 includes the regenerative power generation control unit 52 that controls regenerative power generation by controlling loads on the front motor 2 and the rear motor 5 via the front motor control unit 16 during deceleration running.

The vehicle 1 also includes a skid suppression device (ASC). The skid suppression device determines the occurrence of a skid of the vehicle 1 during running based on the rotational speed or the like of the respective wheels 4, 6 by a skid suppression control unit 53, which is included in the hybrid control unit 18. When the occurrence of a skid is determined, the skid suppression device suppresses the skid of the vehicle 1 by individually controlling braking devices disposed on the front, rear, right, and left sides. The function of the skid Suppression device can be restricted by a driver turning off an ASC switch 61.

The hybrid control unit 18 for the vehicle 1 of the present embodiment further includes a slippage Suppression control unit 55 that performs feedback control on an output ratio and the like in order to achieve appropriate slippage between the front and rear wheels of the vehicle 1 (longitudinal slippage) and appropriate slippage between the left and right wheels of the vehicle 1 (lateral slippage) during four-wheel driving. When slippage of the wheels 4, 6 is detected based on the rotational speeds or the like of the respective wheels 4, 6 which are detected by wheel speed sensors 54 (rotational speed detection units) or the like, provided to the respective wheels (front and rear left and right wheels) 4, 5, the slippage suppression control unit 55 suppresses the slippage by controlling output ratios between the front left and right wheels and the rear left and right wheels.

The vehicle 1 of the present embodiment includes a T/A oil temperature sensor 30 (temperature detection unit) that detects a lubricating oil temperature (oil temperature) in the transaxle 7.

The hybrid control unit 18 includes a T/A protection control unit 50 (protection control unit) that performs transaxle protection control of suppressing an excessive rise in temperature of the transaxle 7.

Hereinafter, the transaxle protection control will be described with reference to FIGS. 3 and 4.

Figure 2:
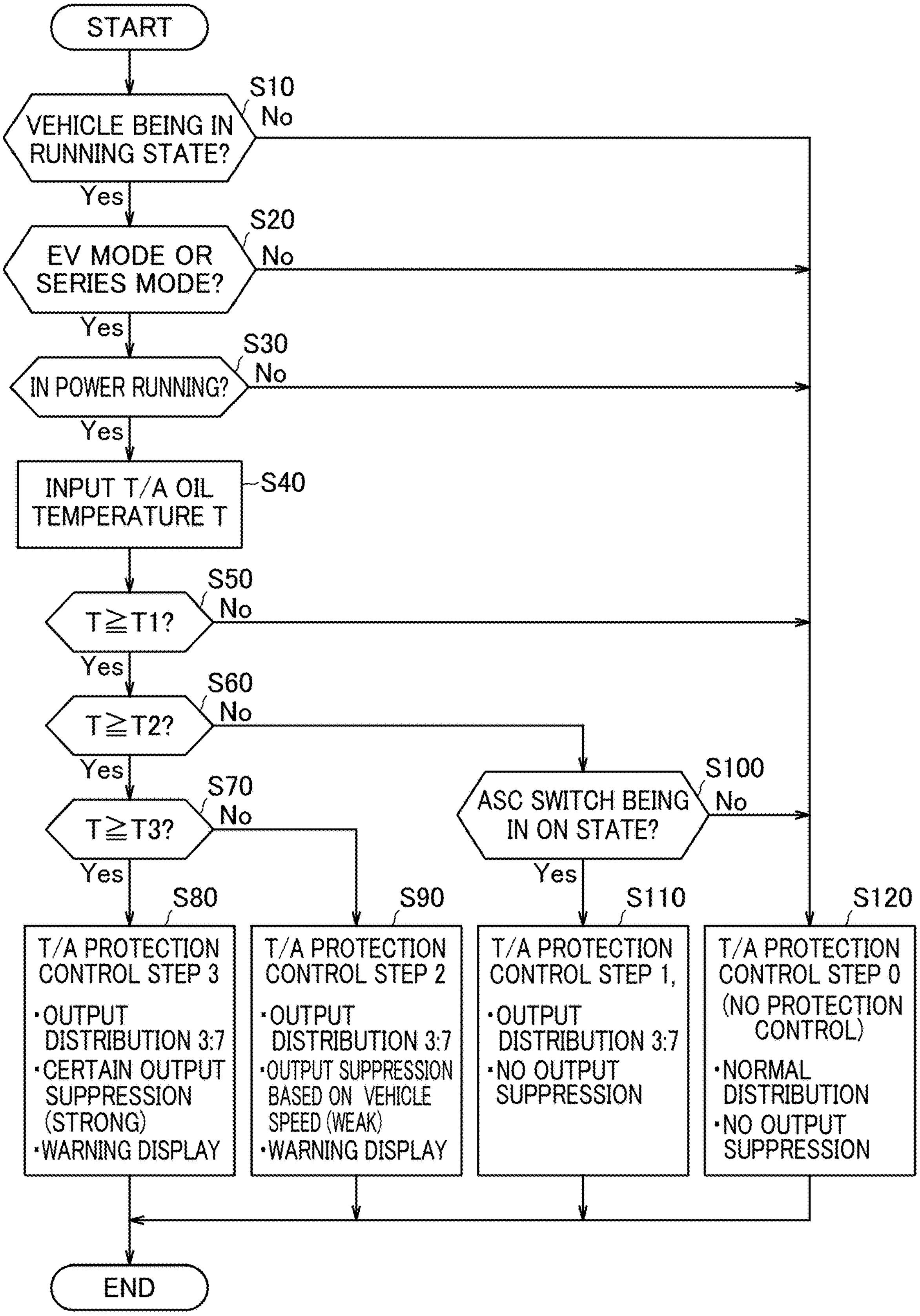
FIG. 2 is a flowchart showing a control procedure of transaxle protection control performed by a T/A protection control unit.

FIG. 2 is a flowchart showing a control procedure of the transaxle protection control performed by the T/A protection control unit 50. FIG. 3 is a table collectively showing the control details of the transaxle protection control.

The transaxle protection control in the present embodiment is performed when the power supply of the vehicle 1 is in an ON state.

First, in step S10, when the vehicle is in a running state, the process proceeds to step S20. When the vehicle is not in a running state, that is, when the vehicle running is in a stop state, the process proceeds to step S110.

In step S20, it is determined whether the running mode of the vehicle 1 is an EV mode or a series mode. When the running mode is the EV mode or the series mode, the process proceeds to step S30. When the running mode is neither the EV mode nor the series mode, that is, when the running mode is a parallel mode, the process proceeds to step S120.

In step S30, it is determined whether or not the vehicle 1 is in power running, in which the vehicle 1 is run and driven by the engine 3 and the motors 2, 5. When the vehicle 1 is in power running, the process proceeds to step S40. When the vehicle 1 is not in power running, that is, when the vehicle 1 is in regenerative power generation, the process proceeds to step S120.

In step S40, an oil temperature T in the transaxle 7 is input from the T/A oil temperature sensor 30. Then, the process proceeds to step S50.

In step S50, it is determined whether or not the oil temperature T input in step S40 is a first threshold T1 or more. Note that it is sufficient to suitably set the first threshold T1 to, for example, a value slightly smaller than the maximum value of the allowable range for oil temperature that causes no problem in the operation of the transaxle 7 and transfer efficiency. When the oil temperature T is the first threshold T1 or more, the process proceeds to step S60. When the oil temperature T is less than the first threshold T1, the process proceeds to step S120.

In step S60, it is determined whether or not the oil temperature T input in step S40 is a second threshold T2 or more. It is sufficient to set the second threshold T2 to a value that is within the allowable range for the oil temperature T in the transaxle 7, and that is larger than the first threshold T1. When the oil temperature T is the second threshold T2 or more, the process proceeds to step S70. When the oil temperature T is less than the second threshold T2, the process proceeds to step S100.

In step S70, it is determined whether or not the oil temperature T input in step S40 is a third threshold T3 or more. It is sufficient to suitably set the third threshold T3 to a value that is larger than the second threshold T2, and that is close to the maximum value within the allowable range for the oil temperature in the transaxle 7. When the oil temperature T is the third threshold T3 or more, the process proceeds to step S80. When the oil temperature T is less than the third threshold T3, the process proceeds to step S90.

In step S80, T/A protection control STEP 3 is performed. In the T/A protection control STEP 3, driving force distribution (output distribution) between the front wheels and the rear wheels is set to 3:7 (T/A protection distribution). This T/A protection distribution, that is, 3:7, is the setting for which the rear wheels 6 have the largest distribution within a range that can allow a change of vehicle characteristics, such as straight advancing performance, and for which restrictions are imposed on distribution to the front wheels 4 side. In addition, the output (required output) of the entire vehicle is suppressed to a certain output value Pmin. This output value Pmin is a value that surely reduces the oil temperature T in the transaxle 7. Further, an informing device 60, such as an instrumental panel, voice or the like, is caused to make output suppression alerts informing the driver of the vehicle 1 of the fact that output suppression is being performed. Then, the present routine is ended.

In step S90, T/A protection control STEP 2 is performed. In the T/A protection control STEP 2, driving force distribution between the front wheels and the rear wheels is set to the T/A protection distribution, that is, 3:7. In addition, the running output (required output) of the entire vehicle is suppressed based on the vehicle speed V. In this step, it is sufficient to set the suppression amount (predetermined amount) of the running output of the vehicle 1 to a value which falls within a range of less than the suppression amount in the T/A protection control STEP 3, and to set the suppression amount to be smaller as the vehicle speed V increases, for example. Then, the present routine is ended.

In step S100, it is determined whether or not the ASC switch 61 is active. When the ASC switch 61 is in an ON state, that is, when skid suppression control is ON, the process proceeds to step S110. When the ASC switch 61 is in an OFF state, that is, when the skid suppression control by the skid suppression control unit 53 is prohibited, the process proceeds to step S120.

In step S110, T/A protection control STEP 1 is performed. In the T/A protection control STEP 1, driving force distribution between the front wheels and the rear wheels is set to the T/A protection distribution, that is, 3:7. Note that a running output is not suppressed. Then, the present routine is ended.

In step S120, T/A protection control is not performed (STEP 0). That is, the distribution ratio between the front side and the rear side of the vehicle is usual distribution (approximately 40 to 50:60 to 50), and a running output is not suppressed. Then, the present routine is ended.

When the control details of the transaxle protection control described above are shown in a table, the table shown in FIG. 3 is obtained.

In the present embodiment, as shown in FIG. 3, the transaxle protection control is performed in any of drive modes (a normal mode, an eco mode, a power mode, and other modes) in which the degrees of output of the motors 2, 5 and the engine 3 relative to the operation amount of an accelerator is changed.

Regarding the running mode, the transaxle protection control is performed in the EV mode or the series mode, but the transaxle protection control is not performed in the parallel mode. The reason for this is that, in the parallel mode, the front wheels 4 are driven by both the engine 3 and the front motor 2, so that the output of the front motor 2 is suppressed and hence, there is no possibility of an oil temperature in the transaxle 7 exceeding the allowable temperature.

Although the transaxle protection control is performed during power running, the transaxle protection control is not performed during regenerative running. The reason for this is that the amount of power that transfers through the transaxle 7 is smaller during regenerative running than during power running and hence, there is no possibility of temperature of the transaxle 7 exceeding the allowable temperature.

In the transaxle protection control, STEP 0 (no output distribution control and no output suppression control) is performed when the oil temperature T in the transaxle 7 is less than the first threshold T1, STEP 1 is performed when the oil temperature T is the first threshold T1 or more and less than the second threshold T2, STEP 2 is performed when the oil temperature T is the second threshold T2 or more and less than the third threshold T3, and STEP 3 is performed when the oil temperature T is less than the third threshold T3.

In STEP 1, output distribution is set to the T/A protection distribution, that is, 3:7 (output distribution control).

In STEP 2, output distribution is set to the T/A protection distribution, that is, 3:7, and output suppression is performed based on the vehicle speed V (the output distribution control and the output suppression control). Further, a warning display informing the driver of the fact that output suppression is being performed is made by the informing device 60.

In STEP 3, output distribution is set to the T/A protection distribution, that is, 3:7, and output is suppressed to a certain value smaller than the output in STEP 2 (the output distribution control and the output suppression control). Further, a warning display informing the driver of the fact that output suppression is being performed is made. Note that warning issued at this point of operation is preferably stronger than the warning in STEP 2.

However, when the oil temperature T is the first threshold T1 or more and less than the second threshold T2, and the ASC switch 61 is in an OFF state, neither the output distribution control nor the output suppression control is performed. The reason for this is that warning is not issued in STEP 1 and hence, it is necessary to guarantee running stability of the vehicle 1 by the skid Suppression device (ASC).

Further, also in the above-mentioned cases in which the output distribution is the T/A protection distribution, that is, 3:7, in the T/A protection control STEP 1 to the T/A protection control STEP 3, the slippage suppression control unit 55 is allowed to perform feedback control on the output ratio in order to suppress slippage between the left and right wheels of the vehicle.

Transitions among the T/A protection control STEP 0 to the T/A protection control STEP 3 will be described with reference to FIG. 4.

Figure 4:
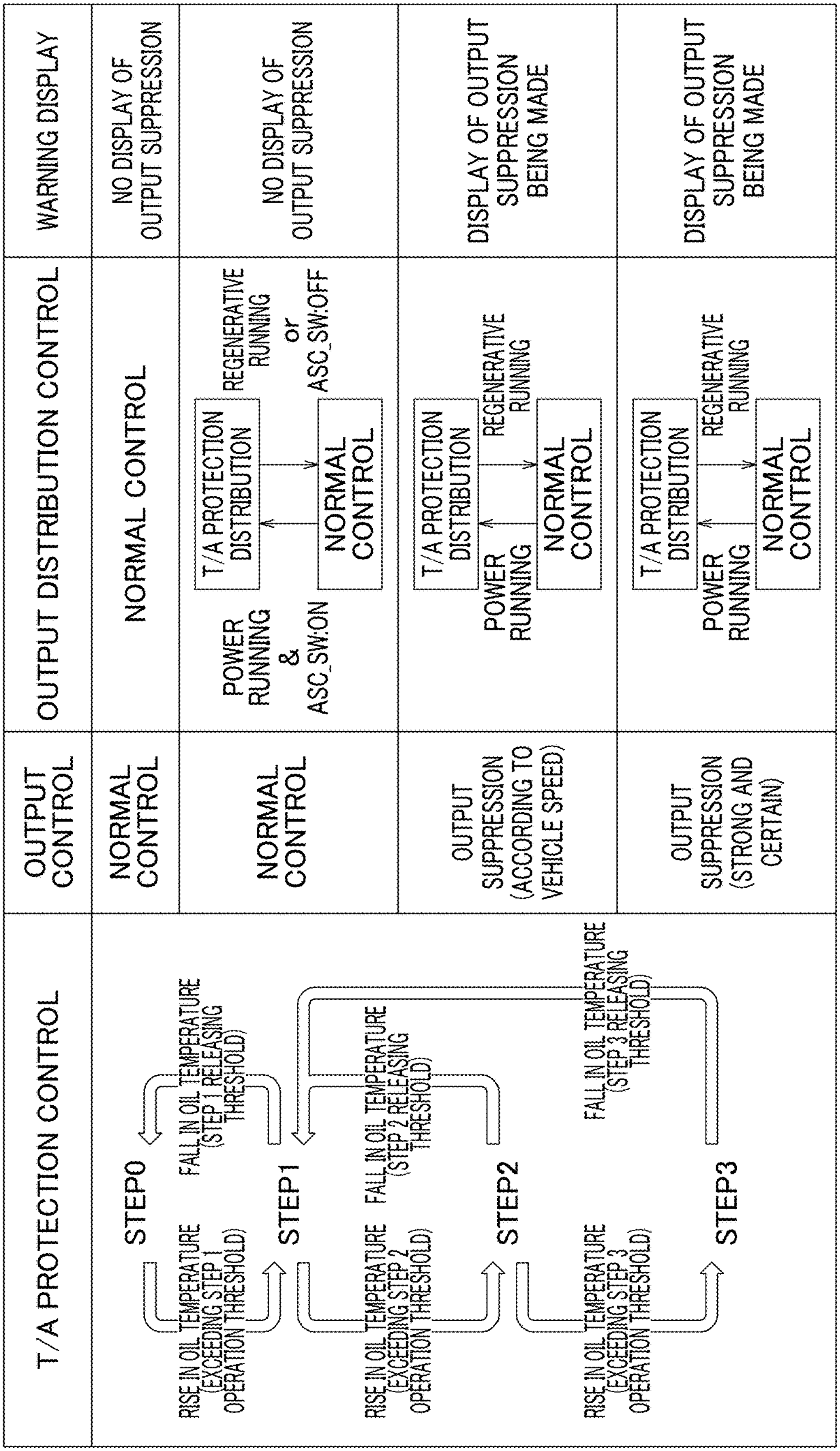
FIG. 4 is a diagram illustrating transitions among respective steps in the transaxle protection control.

As shown in FIG. 4, as the oil temperature T rises, the T/A protection control shifts to STEP 1, STEP 2, and STEP 3 from STEP 0, in which the oil temperature T in the transaxle 7 is less than the first threshold T1.

In a case in which the oil temperature T falls to less than the third threshold T3 from the third threshold T3 or more by performing the T/A protection control STEP 3, the T/A protection control skips the T/A protection control STEP 2, and shifts to the T/A protection control STEP 1. The reason for this is that when the T/A protection control STEP 3 is performed, the temperature of the transaxle 7 is reduced, so that the oil temperature T frequently makes a rapid drop to less than the second threshold T2 from the third threshold T3 or more and hence, by ending the output suppression control without performing the output suppression control according to the vehicle speed, the number of times of control switching is suppressed, thus suppressing even small influences on running performance.

Regarding the thresholds T1 to T3 for determining the respective steps, it is preferable to set different values for the case of a rise in oil temperature and for the case of a fall in oil temperature. For example, by setting the thresholds T1 to T3 for the case of a fall in oil temperature to values slightly smaller than the thresholds T1 to T3 for the case of a rise in oil temperature, it is possible to suppress the number of times of switching STEP when an oil temperature varies in the vicinity of the threshold and hence, switching of output distribution and output suppression more than necessary is suppressed, leading to enhancement of running stability.

As described above, the vehicle 1 according to the present embodiment is a 4-wheel drive vehicle in which the front wheels 4 are driven by power transferred from the front motor 2 and the engine 3 via the transaxle 7, and the rear wheels 6 are driven by the rear motor 5. The hybrid control unit 18 for the vehicle 1 calculates a required output for running the vehicle, sets the output ratio between the front wheels 4 side (the front motor 2 and the engine 3 side) and the rear wheels 6 side (the rear motor 5 side), and calculates the outputs of the front motor 2, the engine 3, and the rear motor 5 based on the required output for the vehicle 1 and the output ratio.

When the oil temperature T in the transaxle 7 becomes the first threshold T1 or more, the T/A protection control unit 50, which is included in the hybrid control unit 18, performs the output distribution control as the transaxle protection control, the output ratio between the front wheels 4 side (the front motor 2 and the engine 3 side) and the rear wheels 6 side (the rear motor 5 side) being set to 3:7 in the output distribution control. The output ratio between the front wheels 4 side and the rear wheel side is usually approximately 40 to 50:60 to 50 and hence, when the oil temperature T becomes the first threshold T1 or more, the proportion of the output on the front wheels 4 side drops to lower than that of the case in which the oil temperature T is less than the first threshold T1.

Consequently, when the oil temperature T in the transaxle 7 becomes the first threshold T1 or more, the amount of power that transfers through the transaxle 7 is reduced by reducing the outputs of the front motor 2 and the engine 3 and hence, it is possible to suppress a rise in temperature of the transaxle 7.

Although the proportion of the output on the front wheels 4 side is reduced by performing the output distribution control in the transaxle protection control, the total output of the front wheels 4 side and the rear wheels 6 side is maintained. Consequently, the running output of the vehicle 1 is ensured, and it is possible to suppress a drop in running performance of the vehicle 1.

Although the running mode of the vehicle 1 can be switched to the EV mode, the series mode, or the parallel mode, when the running mode is the EV mode or the series mode, the transaxle protection control (the output distribution control and the output suppression control) is performed, whereas when the running mode is the parallel mode, the transaxle protection control is not performed.

Consequently, when the running mode is the EV mode or the series mode, a rise in temperature of the transaxle 7 is suppressed by performing the transaxle protection control as described above, whereas when the running mode is the parallel mode in which the amount of power transfer in the transaxle 7 is smaller than that in the EV mode and the series mode, so that the temperature of the transaxle 7 is less likely to rise, unnecessary changes of the output ratio between the front side and the rear side and unnecessary reduction of output are not performed during running of the vehicle by not performing unnecessary transaxle protection control and hence, it is possible to suppress a drop in running performance of the vehicle 1.

Further, although a rise in temperature of the transaxle 7 is suppressed by performing the transaxle protection control (the output distribution control and the output suppression control) during power running, in which the vehicle is run and driven by the engine 3 and the motors 2, 5, the transaxle protection control is not performed during regenerative running, in which regenerative power generation is performed. Consequently, by not performing unnecessary transaxle protection control during regenerative running that does not require output from the front motor 2, it is possible to suppress a drop in running performance of the vehicle 1.

The transaxle protection control is switched to STEP 1 to STEP 3 based on the oil temperature T in the transaxle 7.

When the oil temperature T in the transaxle 7 is the first threshold T1 or more and the second threshold T2 or less, only the output distribution control out of the output distribution control and the output suppression control is performed and hence, as described above, a rise in temperature of the transaxle 7 is suppressed, and the running output of the entire vehicle is ensured.

When the oil temperature T in the transaxle 7 is the second threshold T2 or more and the third threshold T3 or less, the output suppression control is performed together with the output distribution control as STEP 2 and hence, the output of the entire vehicle is suppressed.

Consequently, the amount of power that transfers through the transaxle 7 is further reduced, thus further suppressing a rise in temperature of the transaxle 7. Further, the required output is reduced based on the vehicle speed V and hence, it is possible to set the reduction amount of the required output to a minimum necessary amount corresponding to the effect of suppressing a rise in temperature of the transaxle 7 caused by running wind.

When the oil temperature T in the transaxle 7 is the third threshold T3 or more, the output suppression control in STEP 3, in which an output is further suppressed compared with STEP 2, is performed and hence, the amount of power that transfers through the transaxle 7 is further reduced, thus even further suppressing a rise in temperature of the transaxle 7.

The vehicle 1 includes the ASC configured to prevent skid, and includes the ASC switch 61 configured to restrict the function of the ASC. However, when the ASC switch 61 is in an OFF state, the transaxle protection control is not performed in STEP 1.

To be more specific, the transaxle protection control is performed when the ASC switch 61 is in an ON state, that is the function of the ASC is active, and hence, it is possible to ensure running stability of the vehicle 1 by the ASC function, and it is also possible to suppress a rise in temperature of the transaxle 7. Whereas the transaxle protection control (the output distribution control of fixing the output ratio between the front side and the rear side) is not performed when the ASC switch 61 is in an OFF state and hence, it is possible to suppress a drop in running performance of the vehicle 1.

Note that the transaxle protection control is restricted based on the ASC switch 61 only in STEP 1, but is not restricted in STEP 2 and STEP 3, in which the oil temperature T in the transaxle 7 is the second threshold T2 or more. In STEP 2 and STEP 3, the informing device 60 issues warning to the driver to inform that the transaxle protection control is to be performed and hence, the driver can cope with the transaxle protection control, the output ratio between the front side and the rear side being changed and the output being suppressed in the transaxle protection control. Accordingly, it is possible to suppress a rise in temperature of the transaxle 7 by performing the transaxle protection control.

Further, when feedback control (longitudinal slippage suppression control/lateral slippage suppression control) is performed during four-wheel driving, the output distribution control is not performed, and the feedback control is allowed and hence, it is possible to ensure performance of getting out of a bad road at the time of slippage.

Although the description of the embodiment is completed so far, the aspect of the present invention is not limited to this embodiment.

For example, only some of various performing conditions (running mode, power running, ASC and the like) for the transaxle protection control in the above-mentioned embodiment may be adopted for determination.

Further, although in the above-mentioned embodiment, the present invention is applied to a hybrid vehicle in which the running mode of the vehicle 1 can be switched to the EV mode, the series mode, or the parallel mode, the present invention may be applied to a vehicle that can have any of the above-mentioned running modes.

The present invention is widely applicable to 4-wheel drive vehicles in which either of front wheels or rear wheels are driven via a transaxle, and the other of the front wheels or the rear wheels are driven without via the transaxle.

It is also applicable to plug-in hybrid vehicles (PHEVs) that can be externally charged or externally powered.

EXPLANATION OF REFERENCE SIGNS

1 vehicle
2 front motor (first running drive mechanism)
3 engine (first running drive mechanism)
4 front wheel (first running wheel)
5 rear motor (second running drive mechanism)
6 rear wheel (second running wheel)
7 transaxle
8 driveshaft
10 motor generator (generator)
18 hybrid control unit (output control unit)
20 vehicle speed sensor (vehicle speed acquisition unit)
30 T/A oil temperature sensor (temperature detection unit)
50 T/A protection control unit (protection control unit)
51 running mode switching unit
52 regenerative power generation control unit
53 skid suppression control unit
54 wheel speed sensor (rotational speed detection unit)
55 slippage suppression control unit

The invention claimed is:

1. A running drive control device for a vehicle in which first running wheels, being either of front wheels or rear wheels, are driven by transferring power to the first running wheels from a first running drive mechanism via a transaxle, and second running wheels, being the other of the front wheels or the rear wheels, are driven by a second running drive mechanism, thus causing the vehicle to run, the running drive control device comprising:

an output control unit that calculates a required output for running the vehicle, sets an output ratio between the first running drive mechanism and the second running drive mechanism, and calculates an output of the first running drive mechanism and an output of the second running drive mechanism based on the required output of the vehicle and the output ratio;

a temperature detection unit that acquires an oil temperature in the transaxle; and a protection control unit that performs transaxle protection control while the required output is maintained in a case in which the oil temperature in the transaxle becomes a first threshold or more, the first threshold being a predetermined value, the transaxle protection control reducing a proportion of the output of the first running drive mechanism compared with the proportion of the output of the first running drive mechanism of a case in which the oil temperature in the transaxle is less than the first threshold.

2. The running drive control device for a vehicle according to claim 1, wherein the first running drive mechanism includes an engine and an electric motor, the engine, the electric motor, and a generator are connected to the transaxle, a running mode switching unit is provided, the running mode switching unit being configured to switch between at least either one of a series mode or an EV mode and a parallel mode, power being generated by driving the generator by transferring power to the generator from the engine via the transaxle, and the first running wheels being driven by transferring power to the first running wheels from the electric motor via the transaxle in the series mode, the first running wheels being driven by the electric motor via the transaxle in the EV mode, the first running wheels being driven by the engine and the electric motor in the parallel mode, and the protection control unit performs the transaxle protection control in a case in which switching to the series mode or the EV mode is performed by the running mode switching unit, whereas the protection control unit does not perform the transaxle protection control in a case in which switching to the parallel mode is performed.

3. The running drive control device for a vehicle according to claim 1, further comprising a regenerative power generation control unit that causes regenerative power generation to be performed during deceleration running of the vehicle, the regenerative power generation generating power by forcibly driving the first running drive mechanism by a rotational force of the first running wheels, wherein the protection control unit performs the transaxle protection control during power running of the first running drive mechanism, whereas the protection control unit does not perform the transaxle protection control during a period in which the regenerative power generation is being performed.

4. The running drive control device for a vehicle according to claim 1, wherein the vehicle includes a skid suppression control unit that suppresses a skid of the vehicle by controlling rotational speeds of the first running wheels and the second running wheels at a time of occurrence of the skid, and the protection control unit performs the transaxle protection control in a case in which skid suppression control by the skid suppression control unit is active, whereas the protection control unit does not perform the transaxle protection control in a case in which the skid suppression control by the skid suppression control unit is prohibited.

5. The running drive control device for a vehicle according to claim 1, further comprising a vehicle speed acquisition unit that acquires a running speed of the vehicle, wherein in a case in which the oil temperature in the transaxle is a second threshold or more, the second threshold being larger than the first threshold, the protection control unit reduces the required output to a predetermined amount which is set based on the running speed.

6. The running drive control device for a vehicle according to claim 5, wherein the vehicle includes a skid suppression control unit that suppresses a skid of the vehicle by controlling rotational speeds of the first running wheels and the second running wheels at a time of occurrence of the skid, and in a case in which the oil temperature in the transaxle is the second threshold or more, the protection control unit performs the transaxle protection control even in a case in which skid suppression control by the skid suppression control unit is prohibited.

7. The running drive control device for a vehicle according to claim 5, wherein in a case in which the oil temperature in the transaxle is a third threshold or more, the third threshold being larger than the second threshold, the protection control unit reduces the required output to a value remarkably lower than a maximum value of the predetermined amount.

8. The running drive control device for a vehicle according to claim 1, further comprising:

a rotational speed detection unit that detects rotational speeds of the front wheels and the rear wheels; and a slippage suppression control unit that performs, in a case in which slippage of the front wheels or the rear wheels is detected based on the rotational speeds, feedback control on the output ratio to suppress the slippage, wherein the protection control unit allows the feedback control to be performed even in a case in which the transaxle protection control is being performed.

9. The running drive control device for a vehicle according to claim 6, wherein in a case in which the oil temperature in the transaxle is a third threshold or more, the third threshold being larger than the second threshold, the protection control unit reduces the required output to a value remarkably lower than a maximum value of the predetermined amount.

* * * * *